July 15, 1941. M. B. MENTLEY 2,249,251
METHOD OF AND APPARATUS FOR CROWNING GEARS
Filed March 14, 1938   3 Sheets-Sheet 2
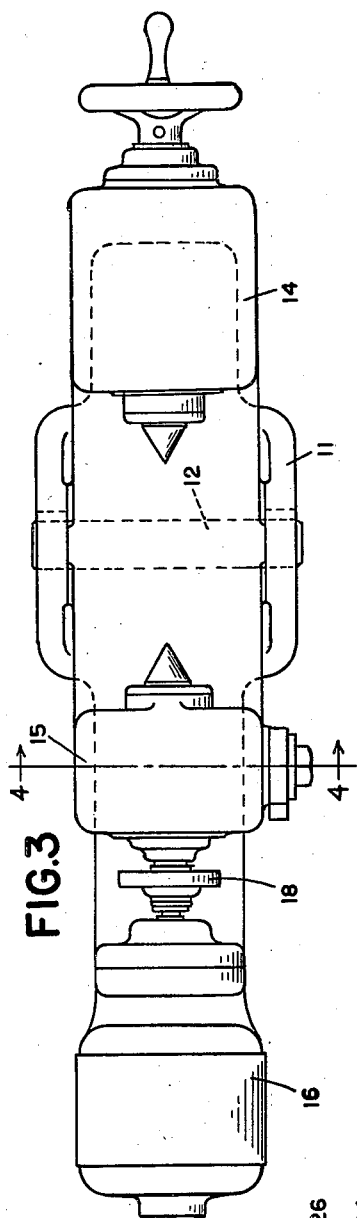
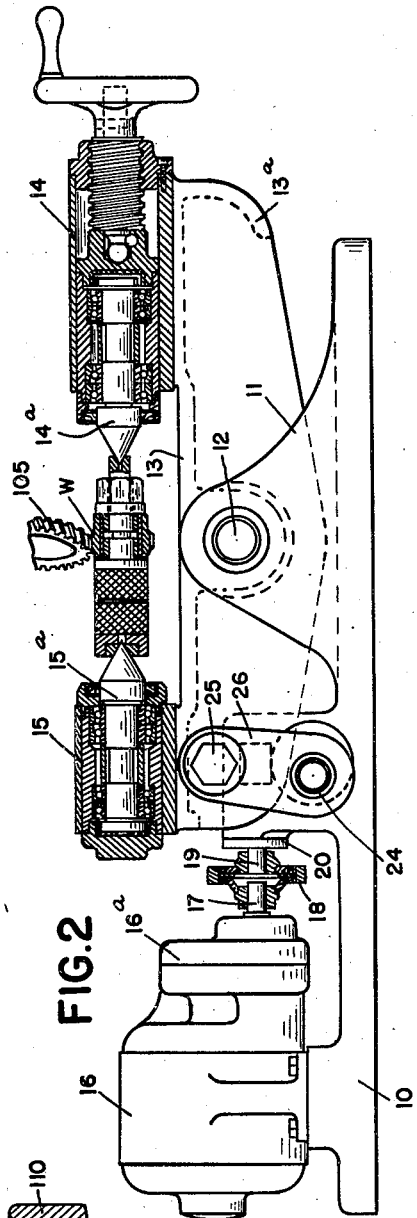
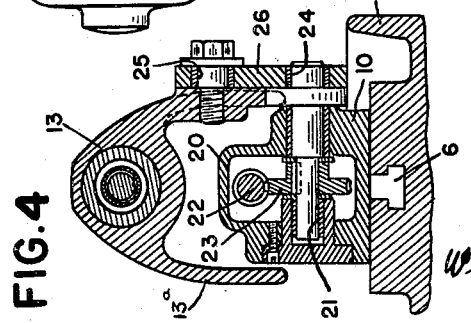
INVENTOR
MAX B. MENTLEY
BY
Whittemore, Hulbert & Belknap
ATTORNEYS

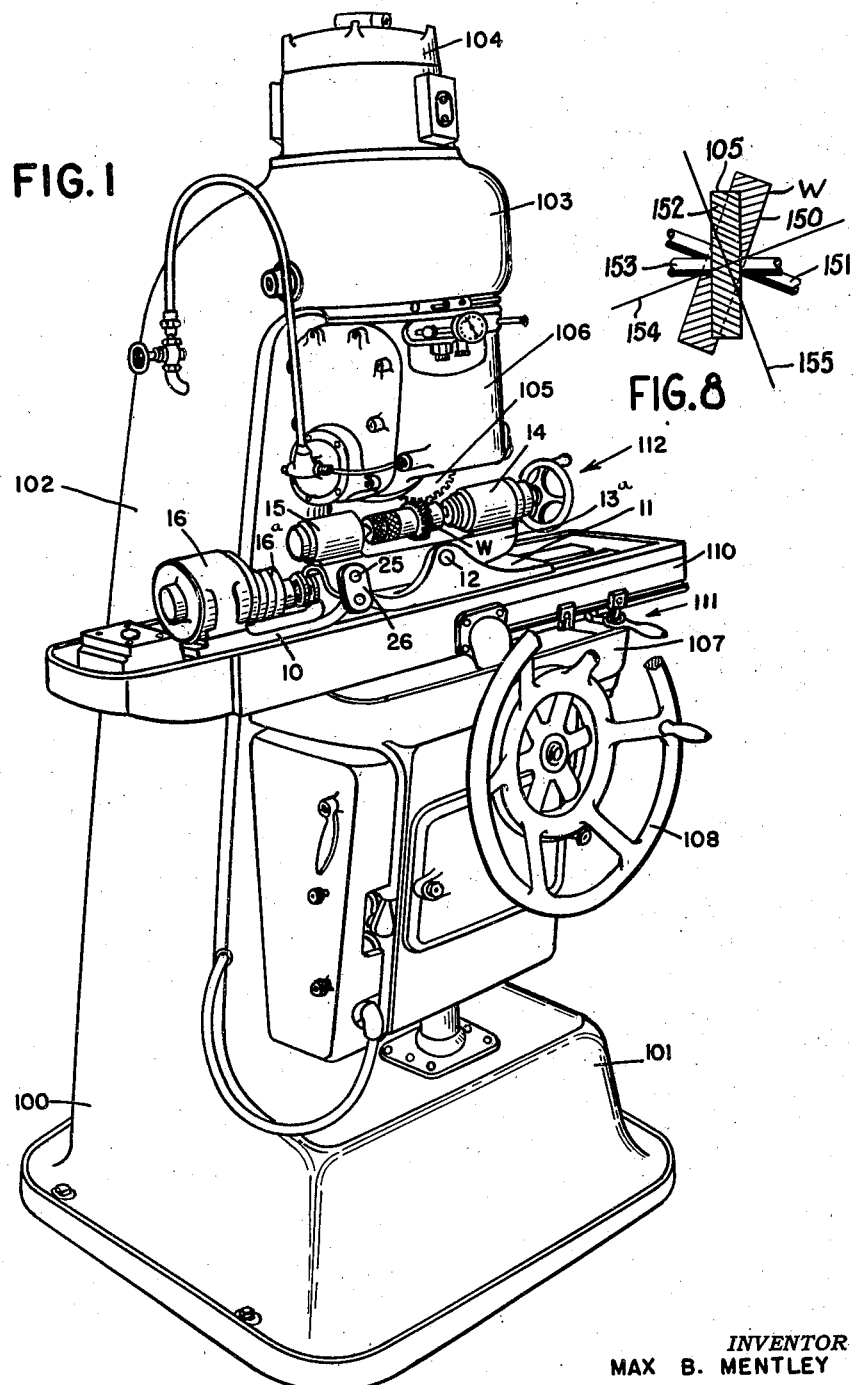

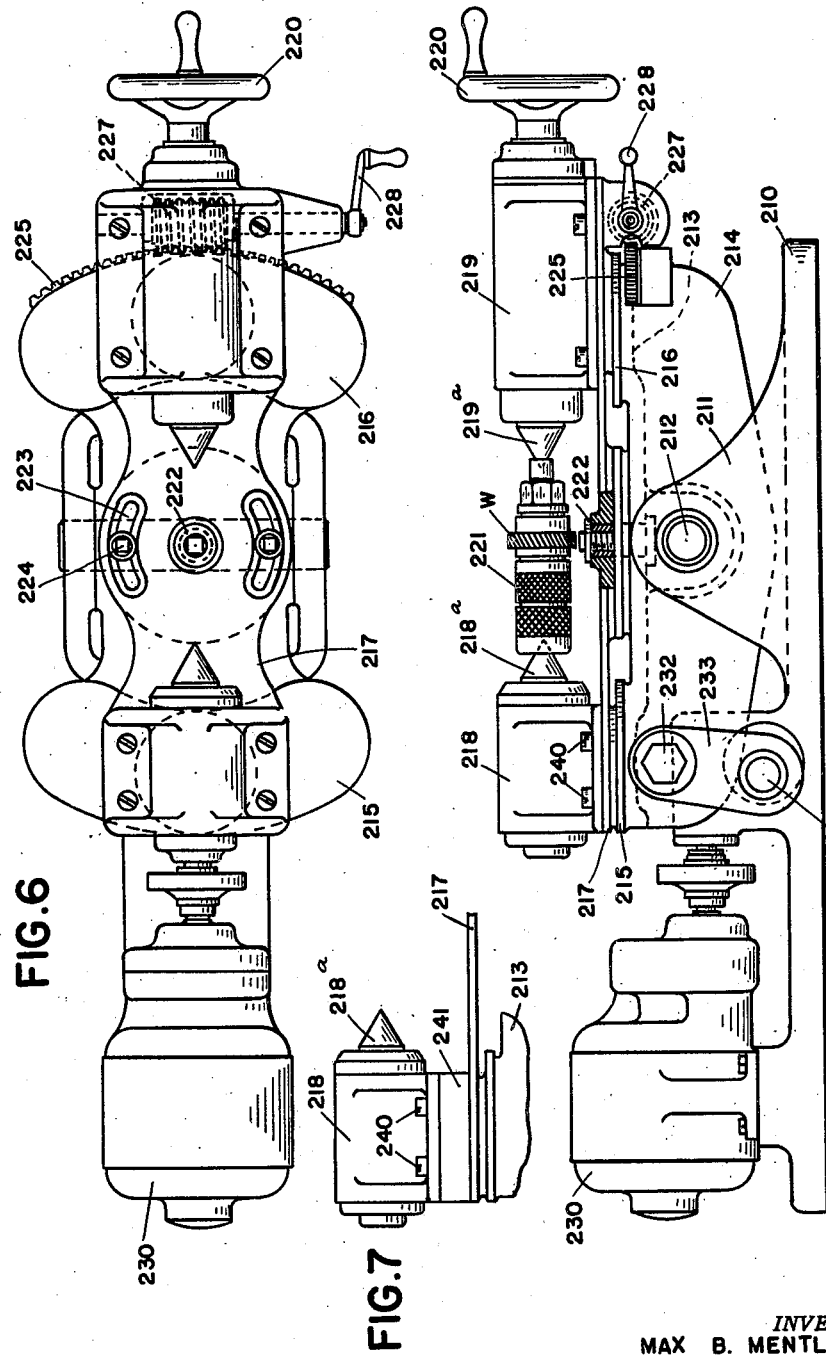

Patented July 15, 1941

2,249,251

UNITED STATES PATENT OFFICE 2,249,251

METHOD OF AND APPARATUS FOR CROWNING GEARS

Max B. Mentley, Detroit, Mich., assignor to National Broach & Machine Company, Detroit, Mich., a corporation of Michigan Application March 14, 1938, Serial No. 195,875

8 Claims. (Cl. 90—1.6)

This invention relates to a machine for crowning gear teeth from end to end.

In the past it has been the practice to provide gear teeth which are crowned from end to end for the purpose of shifting the bearing of these teeth toward the center and away from the edges thereof. As will be obvious, this type of crowning permits slight axial misalignment and also permits slight relative motion between shafts supporting meshed gears without causing undesirable end bearing on the teeth.

By means of my herein disclosed machine, I am enabled to provide crowning of gear teeth from end to end about a relatively short radius. As a result of this, it is possible to produce gear teeth which present a maximum amount of crowning and which at the same time retain desired characteristics as to form, spacing, etc. It is accordingly an object of the present invention to provide a machine for crowning gear teeth from end to end.

It is a further object of the invention to provide a machine which is adapted to provide a maximum amount of crowning without the introduction of errors into the gear teeth.

It is a further object of the invention to provide novel mechanism for oscillating a spur gear to be finished about an axis perpendicular to the axis of the gear.

It is a further object of the invention to crown spur gear teeth by oscillating the gear about an axis perpendicular to the axis of the gear while in mesh with a rotating gear-like finishing tool.

It is a further object of the invention to crown helical gears by oscillating said gears about an axis transverse to the gear axis while in mesh with a rotating gear-like finishing tool, the axes of oscillation being such that the meshed teeth of said gear move in a path substantially parallel to their length.

It is a further object of the invention to provide a machine for oscillating a gear about an axis which crosses the gear axis at an angle substantially equal to the helix angle of the gear.

It is a further object of the invention to accurately finish gear teeth and simultaneously to provide the same with a crowned bearing surface from tooth end to tooth end and by means of a gear finishing machine in which the gear to be finished is run in mesh at crossed axes with a gear finishing tool, and by simultaneously without translation, rocking the gear to be finished about an axis transverse to the axis of the gear to be finished.

Other objects will be apparent as the description proceeds, and when taken in conjunction with the accompanying drawings wherein Fig. 1 is a diagrammatic view showing a gear finishing machine equipped with a crowning mechanism;

Fig. 2 is an elevation partly in section showing the crowning mechanism;

Fig. 3 is a plan view of the mechanism shown in Fig. 4;

Fig. 4 is a section on the line 4—4 of Fig. 3;

Fig. 5 is an elevation of a modified crowning mechanism adjustable to finish both spur and helical gears;

Fig. 6 is a plan view of the device shown in Fig. 5;

Fig. 7 is a detail view of means for adjusting the gear with respect to its axis of oscillation; and Fig. 8 is a diagrammatic view illustrating the relationship between the axes of the gear and tool and the axis and plane of relative oscillation thereof.

The crowning mechanism forming the subject matter of the present invention is embodied in a gear finishing machine of the type in which the gear to be finished is run in mesh with a gear finishing tool at crossed axes. The gear finishing tool takes the form of a gear member conjugate to the gear to be finished and is formed of high speed tool steel. The teeth of the gear finishing tool are provided with a plurality of closely spaced serrations which result in the formation of a plurality of upstanding lands. These lands are formed at their top edge with sharp corners which serve as cutting edges. The gear finishing tool which will hereinafter be referred to as a cutter and the gear to be finished are supported with their axes rigidly spaced. Means are provided to move the cutter and the gear toward each other by predetermined amounts. Suitable motor means are provided to drive either the cutter or the gear and the other member is driven through intermeshing engagement therewith. In the present machine, means are provided to simultaneously oscillate either the cutter or the gear and in the example shown, the gear, about an axis which is perpendicular to its own axis.

It is a property of gears when meshed with their axes crossed that the intermeshing teeth engage only in theoretical point contact. As a practical matter, the gear teeth engage over a relatively small area. This small area of contacts shifts as the teeth move relatively to each other in meshing relation, and it has been found that the area of contact travels in a path diagonally up the face of the tooth, for a helical gear, or straight up the tooth for a spur gear, the angle depending on the helix angle of the gear.

In order to distribute the cutting or shaving action of the cutter across the face of the gear, it is necessary to provide another relative motion between the cutter and the gear. It has been proposed in the past to distribute the shaving action of the cutter across the gear tooth by slowly translating the gear tooth in a plane which contains its axis and which plane is parallel to the axis of the cutter. Translation in this plane will effect distribution of the cutting action across the teeth of the gear being shaved for all directions except a direction parallel to the axis of the cutter. As will be understood, translation of either the gear to be finished or the cutter in the direction of the axis of the cutter, results in bringing different portions of the teeth of the cutter into action without a corresponding distribution of the work across the face of the gear tooth. The result of this will be the formation of a shallow groove which runs diagonally or straight up the face of the tooth of the gear.

In the present gear finishing machine, it is proposed to substitute an entirely different relative motion for the purpose of distributing the gear finishing action across the face of the gear tooth and for simultaneously imparting a predetermined crowned effect to the teeth of the gear.

I have illustrated in Fig. 1 a gear finishing machine embodying my present invention. This machine comprises a frame 100 provided at its lower forward portion with a projecting knee 101 and to the rear of the knee a vertically extending column 102 which in turn is provided at its upward portion with a forwardly projecting tool head 103. The tool carrying head 103 has mounted thereon a motor 104 which is operatively connected through suitable gearing (not shown) to a spindle which carries the cutter 105. The cutter 105 is mounted for rotation about its axis in a swivel portion 106 which is mounted for adjustment about a vertical axis relative to the head 103. By this means it is possible to position the cutter 105 so that it will mesh properly with gears of different helix angle.

Supported from the forwardly projecting knee 101 is a table 107 which is provided with suitable mechanism for elevating the table. This mechanism may be either manual or automatic or both, and in the illustrated embodiment the hand wheel 108 is connected through suitable mechanism to a jack screw (not shown) which serves to adjust the height of the table 107 manually.

A carriage 110 is mounted on the table 107 for translation in a horizontal plane. Suitable cooperating ways are provided between the carriage and table and mechanism interconnects a motor (not shown) which is carried by the table 107 to the carriage 110. This motor and mechanism is adapted to translate the carriage 110 slowly in a direction parallel to the axis of a work gear W.

If desired, automatic mechanism indicated generally at 111 and which may take the form of a mechanically operated reversing switch, may be provided with adjustable stops. The carriage 110 is provided with a T-slot 6, best seen in Fig. 4.

The mechanism supporting the gear W and for oscillating the same, which is indicated generally at 112 in Fig. 1, is shown in detail in Figs. 2 to 4. This mechanism takes the form of a bed plate 10 which is adapted to be rigidly supported to the carriage 110 as by bolts engaging in the T-slots previously referred to. The bed plate 10 is provided intermediate its ends and adjacent each side thereof with upstanding trunnion supports 11, between which is mounted as by means of a pivot member 12, a tool platform 13 which has at each side thereof a downwardly extending skirt 13ᵃ.

The platform 13 is provided at its ends with a head stock housing 14 carrying an adjustable center 14ᵃ and a tail stockhousing 15 carrying a center 15ᵃ. The work gear W is adapted to be supported between these centers for free rotation and as shown in Fig. 2, for this purpose is temporarily mounted on a fixture having portions adapted to receive the centers 14ᵃ and 15ᵃ.

At one end of the bed plate 10 is rigidly supported a motor 16 having suitable reduction gearing 16ᵃ included therewith. The reduction gearing 16ᵃ ultimately drives shaft 17 which is connected as by means of the flexible coupling 18 to a shaft 19. Also carried by the bed plate 10 is a housing indicated generally at 20 in which is supported for rotation a worm 22 which is splined or otherwise secured to the shaft 19. The worm 22 is in mesh with a worm wheel 23 carried by a shaft 21 which is suitably journaled in the housing 20. The shaft 21 extends laterally from the housing 20 and has keyed or otherwise secured thereto a disk carrying an eccentric pin 24. The tool platform 13 is provided from one of the depending skirt portions 13ᵃ with a laterally projecting pin 25 and a link 26 is adapted to interconnect pins 24 and 25.

Since as previously stated the tool platform 13 is mounted on trunnion bars 12, it will be evident that rotation of eccentric pin 24 will cause a precise predetermined oscillation of the platform 13 about the axis of bearings 12.

In Figure 8 I have illustrated the relationship between the axes of the gear W and the tool 105 together with the axis and plane of relative oscillation. In this figure the work gear W is illustrated as being a gear having left-hand teeth 150 meshed with tool 105 having right-hand helical teeth 152. As shown, the axis 151 of the gear is crossed at a limited angle, less than 30°, with the axis 153. This figure is a plan view looking downwardly on the parts, and it will be observed that the tool 105 is uppermost. It will also be observed that the teeth 150 of the gear W, which are in meshing engagement with the teeth 152 of the tool 155, extend downwardly and to the left parallel to the line 154. In this figure, I have drawn the line 155 as perpendicular to the line 154. Reference has previously been made to the fact that the relative rocking movement between the gear and tool is about an axis perpendicular to the direction of the engaged teeth, and in Figure 8 155 represents this axis. It will be understood that 155 is the axis of the pivot pin 12 or 212 previously referred to. The axis 155 is, of course, spaced above or below the zone of meshing engagement between the teeth of the gear and tool so that this relative rocking motion which results from rocking either the gear or tool (and in the embodiment illustrated the gear) has the effect of rounding off more or less of the ends of the teeth of the gear in order to provide a crowned or barrelled tooth.

In the operation of the machine, a gear to be finished W is mounted between the centers 14ᵃ and 15ᵃ, and the table 107 is elevated until the teeth of the gear to be finished and the tooth of the cutter are in tight mesh. It will of course be understood that previous to this the cutter is brought into proper alignment with the work gear by suitable adjustment of the swivel portion 106. The motor 104 is now started and through suitable mechanism rotates the cutter 105. The cutter 105 through the intermeshing of its teeth with the teeth of the work gear W drives the work gear, the work gear being mounted for this purpose for free rotation. The motor 16 is now started which causes the work gear to be oscillated predetermined amounts and very slowly about the axis of the bearings 12. It will be noted that the axis of the bearing 12 is perpendicular to the axis of the work gear W. It should also be noticed that the center about which the platform oscillates is centrally located with respect to the center of crossing of the axes of the cutter and the gear. It will be evident from this that oscillation of the gear W about the center 12 will result in rounding off the ends of the teeth, for the reason that this oscillation causes the ends of the teeth alternately to be moved further in mesh between the teeth of the cutter. It will also be evident that this rounding off or barrelling of the teeth will take place in a controlled manner from end to end with the result that the gear teeth will be uniformly rounded from end to end. It has been found that the crowning which results from this operation may be of maximum amount while at the same time producing gear teeth accurately finished as to other characteristics.

The operation of the machine just described is that adapted to produce maximum crowning from end to end. It will be obvious that the machine as described is capable of other operations. Thus for example it is possible to stop rotation of the motor 16 as soon as the platform 13 returns to initial position after one-half a complete oscillation. This of course will result in gear teeth which are crowned at one end only. It is also possible, and this is particularly desirable in case of relatively wide gears, to translate the gear axially by a translation of the carriage 110 and then to independently round off or crown the ends of the gear teeth. This operation may be performed by manual control of the machine, or as will be obvious, it will be possible to control the starting and stopping of the motor 16 and of the motor which controls translation of the carriage 110 automatically so that it will be necessary only to initiate operation of the machine and subsequently the gear will be completely finished, the central portion of the teeth from end to end being accurately finished, and the end portions of the teeth being accurately crowned a predetermined amount.

It is also possible to crown the ends of the teeth independently of the mid-portion of the teeth by positioning the gear and cutter in the relative positions shown in Fig. 2, but in relatively loose mesh. The result of this will be that the initial inclination imparted to the platform 13 will not cause the cutter to take its cut and, depending upon the amount of clearance initially provided between the teeth of the cutter and work gear, the crowning action of the cutter can be initiated at any predetermined inclination of the platform 13. The cutter and gear will operate smoothly in loose mesh without taking the customary shaving cut on the teeth of the gear being finished.

Other uses of the gear finishing mechanism disclosed will be apparent to those skilled in the art. For example, attention has been called to the fact that the axis about which the platform 13 oscillates is centrally aligned with respect to the center of the crossed axes of the gear and cutter and also centrally aligned with respect to the width of the gear and the cutter. In other words, as will be seen in Fig. 2, with the parts in mid-position the axis of the pivot 12 lies directly below the mid-portion of the teeth of the cutter and also the mid-portion of the teeth of the work gear. For certain purposes it may be desirable to depart from this condition. Thus, by selection of a proper work supporting fixture, adjustment of carriage 110, or adjustment of bed plate 10 relative to carriage 110, the work gear may be supported so that the center of the teeth from end to end is off-set laterally from the line determined between center of crossed axes, and the center of the cutter teeth from end to end. This will result in an irregular crowning with the high portion of the gear tooth closer to one end of the tooth than to the other end with one end of the tooth thinner than the opposite end of the tooth.

The modification just described is particularly well adapted to crown spur gear teeth in the manner shown. This is for the reason that the axis about which the gear to be finished is oscillated is perpendicular to the axis of the gear. Since the teeth of a spur gear are parallel to its axis, oscillation about an axis perpendicular to the axis of the gear causes the individual teeth which are at any moment meshed with the teeth of the cutter to move in an arcuate path generally parallel to the length of said teeth. If this oscillation is imparted to a helical gear while meshed with the rotating cutter it will be obvious that small errors will be introduced which will increase from zero at the mid-portion of the tooth from end to end to a substantial amount at the ends of the teeth, depending upon the helix angle and the radius of the arcuate path in which the oscillation takes place.

In order to avoid the errors which are introduced by oscillating a helical gear about an axis perpendicular to its own axis, I have illustrated in Figs. 5 and 6 modified crowning mechanism in which the gear to be finished is mounted on a swivel plate so that it may be positioned with its axis extending at any desired angle to the axis about which the gear is oscillated.

The mechanism to carry out this modified form of crowning includes a bed plate 210 having upstanding trunnions 211 in which is trunnioned as by the shaft 212 a platform 213. The platform 213 has downwardly projecting skirts 214 which lie between the upstanding trunnions 211 as clearly illustrated in the figures. The platform 213 is elongated and at each end thereof has flat bearing surfaces 215, 216. These surfaces may be further provided with arcuate guiding means such for example as an arcuate slot or an arcuate rib (not illustrated) adapted to cooperate with corresponding means on a swivel plate 217. The swivel plate 217 carries a tail stock 218 and an adjustable head stock 219 provided with manual adjusting means 20 for positioning the center 219a relative to the center 218a. The head stock and tail stock are bolted to swivel plate 217, as by bolts 240. It is contemplated that a gear W to be crowned will be mounted on a suitable fixture 221 which is adapted to be received for free rotation between the centers. The swivel plate 217 is mounted for rotation about a vertical axis as by means of a centrally located pin 222 which is carried by the platform 213. Arcuate slots 223 are provided in the swivel plate and clamping bolts 224 are carried by the platform 213. The clamping bolts project through the arcuate slots 223 and are adapted to clamp the swivel plate in any desired position of adjustment.

In order to provide for accurate adjustment of the swivel plate relative to the platform, a short circular rack section 225 is provided at one end of the platform 213. The swivel plate 217 has a depending housing in which is mounted a worm 227 which is meshed with the rack teeth. The crank 228 is provided for rotating the worm and as will be obvious, rotation of the worm results in rotation of the swivel plate about a central pivot pin 222. A suitable scale and indicator (not shown) may be provided on adjacent relatively movable portions of the platform and swivel plate for the purpose of indicating the angular setting of the swivel plate.

In this modification as in that previously described, a motor 230 is carried by the bed plate and is adapted to drive through suitable reduction gearing a crank pin 231. One of the depending skirts 214 is provided with a pin 232 and a link 233 interconnects pin 232 and crank 231. As will be obvious, operation of the motor 230 results in oscillation of the platform 213 about the horizontal trunnion axis 212.

As indicated at W in Fig. 5, the gear to be crowned may be a helical gear. This helical gear in the finishing operation is meshed with a cutter which is positioned directly above the gear W. Assume for example that the work gear W is a 30° left hand helical gear. In order to properly finish this gear without introducing errors which inherently result from oscillating the gear so that the teeth move transversely to their length, it is necessary to adjust the swivel plate 217 so that teeth at the top of the gear W as seen in Fig. 5 extend generally parallel to the length of the bed plate 210, or in other words, extend substantially perpendicularly to the trunnion axis 212. Since in the assumed example the gear W is a 30° left hand gear, it will be necessary to adjust the swivel plate through an angle of 30° and clockwise as viewed in Fig. 6. This may be accomplished by proper rotation of the crank 228.

If the cutter to be meshed with the gear is for example a 15° right hand cutter which will result in the axes of the cutter and gear being crossed at an angle of substantially 15°, the swivel head corresponding to that shown at 106 in Fig. 1 will be adjusted so that the axis of the cutter extends at an angle of 75° to the trunnion axis. With the mechanism adjusted as above described, it will be apparent that the intermeshed teeth of the cutter and of the gear will extend perpendicular to the trunnion axis. Under these circumstances operation of the motor 230 results in oscillation of the intermeshed teeth of the gear W in an arcuate path generally parallel to their length and also parallel to the length of the engaged teeth of the cutter.

The machine in use will be adjusted so that the tangent to the base helix of the tooth which is in full mesh with the teeth of the cutter will be perpendicular to the trunnion axis, as explained above. It will be understood, of course, that since the teeth are helical, oscillation of the gear blank about the axis defined will result in a relative rotational motion between the cutter and the gear. To further explain this, if the cutter were maintained stationary and the gear blank oscillated about the aforesaid axis, a slight rotation of the gear blank about its own axis would result. During the crowning operation, since either the cutter or the gear blank is mounted for free rotation, this slight additional rotation of the gear blank relative to the cutter is permitted. The result of this is that a tooth of the gear being crowned is permitted to follow a curved path to accommodate for the helical curvature of the tooth.

It is also desirable to provide means to vary the radius of oscillation of gear W, since the amount of crowning is a function of this radius, as well as of the diameter of the helical gear and the helix angle of the gear. This adjustment may be made by any convenient mechanism, and for simplicity is herein illustrated as provided by shims or blocks 241 adapted to be inserted between the head and tail stock and the plate 217, and secured in place by bolts 240.

The motor 16, or 230, is operated at such a speed that the gear W is moved in its arc at an average rate of about .0001 inch per revolution. This relatively slow travel of the work gear relative to the rotation causes the cutting or shaving action of the cutter to be distributed gradually across the surface with the result that extremely smooth, mirror finish surfaces result on the face of the tooth of the gear being finished.

The foregoing detailed description has been given for clearness of understanding only, and no unnecessary limitations should be understood therefrom, but the appended claims should be construed as broadly as permissible in view of the prior art.

What I claim as my invention is:

1. The method of crowning helical gear teeth which comprises meshing a gear member with a gear-like tool member with their axes crossed at an angle of less than 30°, rotating one of said members directly and the other through the meshing engagement therewith, and simultaneously rocking one of said members about an axis substantially perpendicular to the direction of the engaged teeth of said members.

2. The method of crowning helical gear teeth which comprises meshing a gear member with a gear-like tool member with their axes crossed at an angle of less than 30°, rotating one of said members directly and the other through the meshing engagement therewith, and simultaneously rocking said gear about an axis substantially perpendicular to the direction of the engaged teeth of said members.

3. In a gear finishing machine, a tool arbor mounted for adjustment about an axis perpendicular to its axis, a platform, a swivel plate on said platform, a work arbor on said swivel plate, means for adjusting said swivel plate relative to said platform, said arbors being positioned relative to each other so that a gear-like tool on said tool arbor will mesh with a gear to be finished on said work arbor, means for rotating one of said arbors, a fixed support for said platform, said platform being pivotally mounted on said support for oscillation about an axis perpendicular to the axis of adjustment of said swivel plate, and means for effecting slow predetermined oscillation of said platform simultaneous with rotation of said arbors, said means comprising a motor, a crank driven by said motor, and a link joining said crank and said platform.

4. In a gear finishing machine, a tool arbor mounted for adjustment about an axis perpendicular to its axis, a platform, a swivel plate on said platform, a work arbor on said swivel plate, means for adjusting said swivel plate about an axis which is perpendicular to the axis of each of said arbors, said arbors being positioned relative to each other so that a gear-like tool on said tool arbor will mesh with a gear to be finished on said work arbor, means for rotating one of said arbors, a support for said platform, said platform being pivotally mounted on said support for oscillation about an axis perpendicular to the axis of adjustment of said swivel plate, means for effecting slow predetermined oscillation of said platform simultaneous with rotation of said arbors, and means independent of said last mentioned means for translating said support in a plane parallel to the axis of said tool arbor.

5. In a gear finishing machine, a tool arbor mounted for adjustment about an axis perpendicular to its axis, a platform, a swivel plate on said platform, a work arbor on said swivel plate, means for adjusting said swivel plate about an axis which is perpendicular to the axis of each of said arbors, said arbors being positioned relative to each other so that a gear-like tool on said tool arbor will mesh with a gear to be finished on said work arbor, means for rotating one of said arbors, a support for said platform, means intermediate said support and said work arbor for adjusting the distance therebetween, said platform being pivotally mounted on said support for oscillation about an axis perpendicular to the axis of adjustment of said swivel plate, means for effecting slow predetermined oscillation of said platform simultaneous with rotation of said arbors, and means independent of said last mentioned means for translating said support in a plane parallel to the axis of said tool arbor.

6. In a gear crowning machine, a tool arbor, a gear arbor in position to support a gear for meshing engagement with a gearlike tool carried by said tool arbor; a support for said arbors, a platform, means for adjusting both of said arbors about the common normal to their axes, said means comprising in part a swivel plate adjustably carried by said platform, means on said swivel plate for carrying one of said arbors, said platform being mounted for rocking movement about an axis perpendicular to said common normal, said swivel plate providing for adjustment between the axis of the arbor carried thereby and the axis of rocking movement of said platform.

7. In a gear crowning machine, a tool arbor, a gear arbor in position to support a gear for meshing engagement with a gearlike tool carried by said tool arbor, a support for said arbors, a platform pivoted to said support, means for rocking said platform about its pivot axis, and adjustable means on said platform carrying one of said arbors for adjustment relative to said pivot axis in a plane parallel thereto.

8. In a gear finishing machine, a tool arbor mounted for adjustment about an axis perpendicular to the axis of said arbor, a work table mounted for movement toward and away from said tool arbor, a work carriage mounted on said table for reciprocation in a plane parallel to the axis of said tool arbor, a platform pivotally mounted on said carriage for movement about an axis perpendicular to the direction of reciprocation of said carriage, a motor for rotating one of said arbors, a second motor for moving said table toward said tool arbor and for reciprocating said carriage, and a third motor on said carriage connected to said platform for pivoting said platform.

MAX B. MENTLEY.